Oct. 14, 1941.  L. W. THOMPSON ET AL  2,259,091
REGULATOR SYSTEM
Filed Aug. 10, 1940
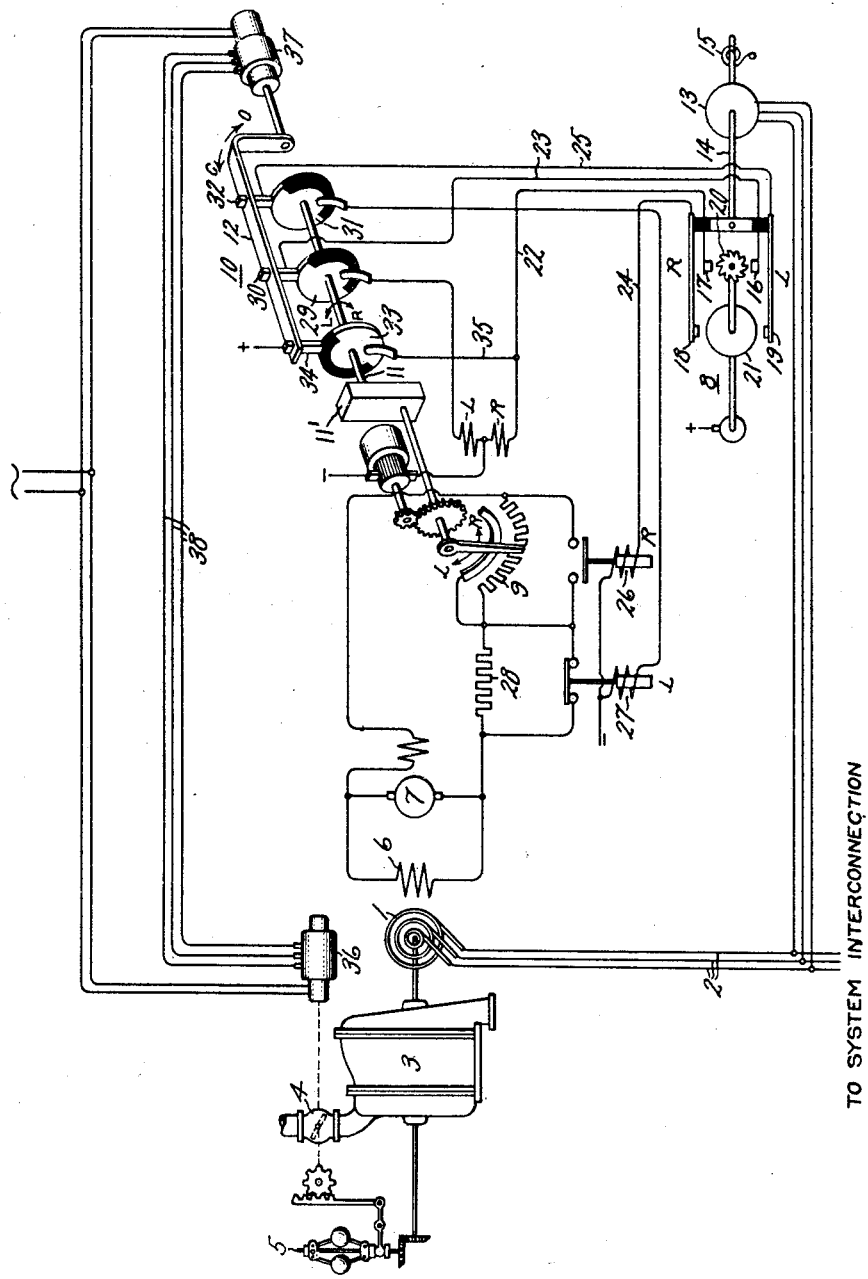
Inventors:
Louis W. Thompson
Selden B. Crary
by Harry E. Dunham
Their Attorney Patented Oct. 14, 1941

2,259,091

UNITED STATES PATENT OFFICE 2,259,091

REGULATOR SYSTEM

Louis W. Thompson and Selden B. Crary, Schenectady, N. Y., assignors to General Electric Company, a corporation of New York Application August 10, 1940, Serial No. 352,090

9 Claims. (Cl. 290—7)

This invention relates to regulator systems and more particularly to improvements in automatic voltage regulator systems for synchronous generators.

It has been found that synchronous generators in power systems which are interconnected with other power systems occasionally fall out of synchronism, thereby causing the flow of heavy currents, the operation of automatic protective means, the disruption of service and the necessity for resynchronizing such machines. In studying this problem we have found that the loss of synchronism is in many cases preceded by the existence of over-voltage on the power systems and it is our theory that the loss of synchronism is caused by the action of the automatic voltage regulators, with which practically all synchronous generators in central stations are provided, which, in attempting to reduce the system over-voltage, reduce the excitation of their associated machines to such a low value that if those machines are carrying any substantial load the lowered value of excitation will not be sufficient to keep the machines in step and they will fall out of synchronism.

In accordance with our invention we provide a regulator system for automatically preventing the loss of synchronism in synchronous generators by reason of automatic voltage regulator action. This may be accomplished by correlating the excitation of the generator with the load on the generator so that, in effect, the voltage regulator is provided with a variable limit on its excitation lowering action which variable limit is adjusted in accordance with the load on the generator.

An object of our invention is to provide a new and improved regulator system.

Another object of our invention is to provide an automatic regulator system for preventing automatic voltage regulator controlled synchronous generators from losing synchronism.

A further object of our invention is to provide a novel and simple arrangement for limiting and controlling the action of a dynamo electric machine regulator in accordance with the load on the machine.

The invention will be better understood from the following description taken in connection with the accompanying drawing and its scope will be pointed out in the appended claims.

The single figure of the accompanying drawing illustrates diagrammatically an embodiment of the invention.

Referring now to the drawing, there is shown therein by way of example a three-phase synchronous generator 1 which supplies power to an interconnected system over a circuit 2. The generator is driven by a suitable prime mover 3 such, for example, as a steam turbine which is provided with a throttle 4 whose position is controlled by any suitable means such as a conventional centrifugal speed governor 5. The generator has a direct current field winding 6 which is energized by a direct current exciter 7. The voltage of the generator is controlled by varying its excitation and this in turn is accomplished by varying the excitation of the exciter. To do this an automatic voltage regulator 8 is provided. This regulator may be of any suitable type and may for example be a rheostatic regulator of the type shown in Thompson Patents 1,848,852 or 1,894,837, both of which are assigned to the assignee of the present application. The illustrated regulator is similar to that shown in the first-mentioned patent and it includes a reversible motor-operated rheostat 9. The degree of excitation of the generator and the amount of load carried thereby are compared by means of a special switching arrangement 10 comprising a first movable member 11 which is operated by the rheostat and a second movable member 12 which is operated by the throttle.

The voltage regulator comprises a main voltage responsive device of any suitable form such as a torque motor 13 connected to respond to the voltage of the generator 1 or circuit 2. As shown for the sake of simplicity, the torque motor terminals are connected directly across the circuit, although it will be understood that in practice potential transformers are usually interposed between the circuit which is of relatively high voltage and the torque motor which has a relatively low voltage rating. The torque motor is provided with a shaft 14 and the torque imparted to this shaft by the motor is counterbalanced by a spring 15 so that only when the voltage is normal will a balance exist and the shaft be at its normal position. Fixed to the shaft 14 is a contact-carrying assembly consisting of four insulated yieldably-mounted contacts 16, 17, 18 and 19. Contacts 16 and 17 are on opposite sides of a rotating star wheel contact 20 and contacts 18 and 19 are on opposite sides of a rotating disk contact 21. Contacts 20 and 21 are mounted on the same shaft and are rotated by any suitable means such as a small electric clock type self-starting synchronous motor (not shown). The contacts are so arranged that when the voltage is at its predetermined normal value no contacts are made between them and they are in the positions illustrated in the drawing. If, however, the voltage falls, the torque motor shaft 14 rotates in a counter-clockwise direction, as viewed in the drawing, causing contact 17 to engage contact 20 if the fall in voltage is small and in addition causing contact 18 to engage contact 21 if the fall in voltage is relatively large. Similarly, if the voltage rises above normal, the shaft 14 is turned in a clockwise direction, first causing only contact 16 to engage contact 20 if the voltage rise is small and then causing contact 19 to engage contact 21 if the voltage rise is large. Contact 16 which makes engagement on small increases in voltage is known as the slow lower contact and contact 19 which makes engagement on large increases in voltage is known as the quick lower contact. Similarly, contacts 17 and 18 are known as the slow raise and quick raise contacts respectively. The reason contacts 18 and 19 can engage contact 21 after contacts 16 and 17 engage contact 20 is because of yieldable spring mountings for contacts 16 and 17. These permit further rotation of the shaft 14 and hence further inward movement of the contacts 18 and 19 after the contacts 16 and 17, as the case may be, engage the contact 20. The common contacts 20 and 21 are connected to one side of a suitable source of control current indicated by the + symbol. The slow raise and lower contacts are connected by means of conductors 22 and 23 to the raise and lower terminals of the driving motor for the motor operated rheostat 9, the common terminal of this motor being connected to the opposite side of the supply source as indicated by the − symbol. The high speed contacts 18 and 19 are connected respectively by means of conductors 24 and 25 to high speed raise and lower contactors 26 and 27. The circuits through these contactors are completed by also connecting the operating windings of the contactors to the − side of the supply source. The high speed raise contactor is a normally open contactor which is connected to short circuit the motor operated rheostat when it is closed. The high speed lower contactor 27 is normally closed and in this condition is connected to short-circuit a resistor 28 connected in series with the motor-operated rheostat in the excitation circuit of the exciter 7.

In order to limit the lowering action of the regulator the low speed lowering circuit controlled by the contact 16 is completed through a pair of contacts 29 and 30 carried respectively by the rotatable members 11 and 12 and the high speed lowering circuit controlled by the contact 19 is completed through a pair of contacts 31 and 32 carried by the rotatable members 11 and 12 respectively. In order to raise the excitation to a safe value for maintaining synchronism as determined by the load on the generator, an auxiliary branch circuit is provided for energizing the low speed raise circuit which is normally controlled by the contact 17. This branch circuit extends from the positive side of the control source through a normally open pair of contacts 33 and 34 carried respectively by the rotatable members 11 and 12 and through a conductor 35 to the conductor 22.

It is usually not convenient to mount the motor-operated rheostat close to the throttle for the prime mover and therefore in order to simplify the mechanical driving connections for the switching means 10, the latter is mounted closely adjacent to either the throttle or the rheostat and is shown by way of example as mounted next to the rheostat so that its rotatable member 11 may be driven by the motor-operated rheostat. As shown they are interconnected by a speed reducing gear box 11'. The rotatable member 12 which will then usually be fairly far away from the throttle is driven from the throttle by any suitable remote positioning means. One such means which is suitable for this purpose is shown in the drawing and consists of a Selsyn transmitter 36 and a Selsyn receiver 37. These two devices are similar in construction, being provided with single-phase rotors energized by any suitable source of alternating current and which are mechanically connected to the throttle 4 and the rotatable member 12 respectively. Their stators are similar to the stators of three-phase induction motors and they are interconnected by a three-phase circuit 38. With this system the rotors of the devices 36 and 37 induce unbalanced voltages in the stator circuit only when the rotors are out of coincidence and these unbalanced voltages cause currents to flow, thereby producing motor torques in the devices. As the rotor position of the device 36 is determined by the position of the throttle, the rotor of the receiver 37 will automatically follow any changes in the position of the transmitter so that the two rotors always occupy corresponding positions with respect to their stators. Thus, the system is the electrical equivalent of a mechanical drive between the throttle and the rotatable member 12.

The operation of the system is as follows: Assume that prime mover 3 is being supplied with steam and is driving the generator 1 at rated speed and that the generator 1 is supplying power to the system over circuit 2 at rated voltage. Under these circumstances the parts will be in the positions shown in the drawing. If now the voltage should fall for any reason the slow raise circuit will be closed through the contacts 17 and 20 if the fall in voltage is slight, and in addition the quick raise circuit will be closed through the contacts 18 and 21 if the fall in voltage is substantial. Closure of the slow raise circuit will cause the motor operated rheostat 9 to operate in a direction to cut out resistance in the exciter field circuit and closure of the high speed raise circuit will cause the high speed contactor 26 to short circuit the motor-operated rheostat thereby producing a large decrease in exciter field resistance and causing a rapid increase in excitation. The raising direction of operation of the motor-operated rheostat is such as to rotate the rotatable member 11 in a clockwise direction, as shown in the drawing. When the voltage returns to normal the raise circuits are broken and the excitation raising operation ceases. If now the voltage becomes higher than normal the slow lowering circuit is closed if the rise in voltage is small and in addition the quick lowering circuit is closed if the voltage increase is large. Closure of the slow lowering circuit through the contacts 16 and 20 reverses the operation of the motor-operated rheostat causing it to insert more of its resistance in the exciter field circuit and causing it to rotate the member 11 in a counterclockwise direction, as view in the drawing. Closure of the high speed lowering circuit through the contacts 19 and 21 causes the high speed lowering contactor 27 to open thereby inserting the resistor 28 in the field circuit and quickly reducing the excitation.

It will be observed that as the lowering operation of the motor-operated rheostat continues the contacts 29 and 31 approach an angular position at which they disengage their co-operating contacts 30 and 32 so that when a predetermined angular relation is reached the lowering circuits will be broken by the separation of the contacts by means of insulating pieces set in the contacts 29 and 31. At the same time that this happens the contact 33 will have been rotated to a position in which it is permitted to engage its co-operating contact 34 thus completing a branch circuit for energizing the motor-operated rheostat in the raising direction. Actually, it is preferable to provide a slight interval between the opening of the lowering circuit controlling contacts 20 and the closing of the raise circuit controlling contacts so as to prevent a pumping action of the system.

The valve of excitation below which the lowering circuits are rendered inoperative and the low speed raise circuit is rendered operative is determined by the angular position of the rotatable member 12. This is determined by the throttle position which in its turn controls the load carried by the generator. The drive for the member 12 is such that when the throttle is moved in an opening direction so as to increase the load the rotatable member 12 is turned in a clockwise direction, as viewed in the drawing, with the result that the predetermined minimum value of excitation below which the lowering circuits are incapacitated and the low speed raising circuit is rendered operative is increased. Similarly, a closing motion of the throttle causes a counter-clockwise rotation of the member 12, thus decreasing the permissible minimum value of excitation.

By means of this invention the minimum permissible value of excitation is determined by the relation between the excitation and loading and is independent of the absolute value of either factor. The minimum permissible value of excitation is determined from the design constants of the generator and is such that its value at no load on the generator is sufficient to maintain synchronous operation thereof.

It will thus be seen that regardless of how high the system voltage should go and consequently regardless of how much the automatic voltage regulator should try to reduce excitation in an attempt to reduce the system voltage the excitation lowering action of the regulator will automatically be stopped at a load responsive minimum limit which is sufficiently high to maintain synchronism under all those conditions, and yet the maximum voltage regulating ability of the generator will be available on the entire range of excitation except at such low values as to be liable to cause loss of synchronism.

While we have shown and described a particular embodiment of our invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States, is:

1. A regulating system for a prime mover driven synchronous generator comprising, in combination, an automatic rheostat voltage regulator, means for automatically limiting voltage lowering action of the rheostatic element of said regulator to a predetermined value, and means responsive to the generator load for varying said predetermined lower limit value inversely with the generator load.

2. In combination, a first movable means whose position is an index of the amount of power passing through a rotary power translating device, a second movable means whose position is an index of the amount of excitation of a dynamo electric machine coupled in power transmitting relation to said device, means for varying the excitation of said machine, and means responsive to a predetermined relative position of said two movable means as distinguished from their absolute positions for preventing said excitation varying means from lowering the excitation.

3. An automatic regulating system for a synchronous generator comprising, in combination, an automatic regulator for said generator having separate circuits for controlling the raising and lowering of the excitation of said generator, a set of contacts in the circuit for controlling the lowering of the excitation of said generator, means operative in accordance with the variations in the excitation of said generator for opening said contacts when the excitation of said generator is below a predetermined value, and means responsive to the load on said generator for raising and lowering said predetermined value in accordance with increases and decreases respectively of the load on said generator.

4. An automatic regulating system for a synchronous generator comprising, in combination, an automatic regulator for said generator having separate circuits for controlling the raising and lowering of the excitation of said generator, separate sets of contacts in each of said circuits, means operative in accordance with excitations of said generator below a predetermined value for causing the set of contacts in the excitation lowering circuit to render said lowering circuit inoperative and for causing the said set of contacts in the excitation raising circuit to render said raising circuit operative, and means responsive to the load on said generator for raising and lowering said predetermined value of excitation in accordance with increases and decreases respectively of the load on said generator.

5. An automatic regulating system for a synchronous generator comprising, in combination, an automatic voltage regulator for said generator having separate normally open circuits for controlling the raising and lowering of the excitation of said generator, a set of normally closed contacts serially connected in said excitation lowering circuit, a set of normally open contacts connected to energize said excitation raising circuits when they are closed, means for opening said normally closed and closing said normally open contacts when the excitation of said generator is below a predetermined value, and means responsive to the load on said generator for raising and lowering said predetermined value of excitation in accordance with increases and decreases respectively of the load on said generator.

6. In combination, a rotatable member carrying three contacts, a second rotatable member carrying three contacts for co-operation respectively with the first three contacts, two sets of said co-operating contacts being normally closed and the remaining set being normally open, said members being so related that said normally closed contacts open and said normally open contacts close when the relative rotation of said members exceeds a predetermined angular relation between them, a synchronous generator, an automatic voltage regulator for said generator, said regulator having a motor operated rheostat and separate high speed raise and lower contactors for controlling the excitation of said generator, separate low speed raise and lower circuits controlled by said regulator for controlling the corresponding direction of operation of said motor operated rheostat, separate high speed raise and lower circuits controlled by said regulator for operating the respective high speed contacts, said normally closed sets of contacts being connected respectively in the low and high speed lowering circuits of said regulator, said normally open contacts being connected in a parallel branch circuit for completing said low speed raise circuit, said motor operated rheostat being connected to rotate one of said rotatable members in a direction tending to exceed said predetermined angular relation when said rheostat is rotated in a lowering direction, a prime mover for driving said generator, and a throttle for controlling the power output of said prime mover, said throttle being connected to rotate the other of said rotatable members in a direction tending to exceed said predetermined angular relation when said throttle is operated in a direction to increase the power output of said prime mover.

7. In combination, a separately energized alternating current power circuit, a synchronous generator connected to supply electrical power thereto, a regulator responsive to the voltage of said generator for automatically controlling the excitation thereof in such a manner as to tend to maintain the voltage of said generator at a predetermined value, said regulator including a motor operated rheostat in the excitation system of said generator, a prime mover for said generator, a throttle for said prime mover, an automatic governor responsive to the speed of said prime mover for operating said throttle in a manner to maintain constant prime mover speed, and means operated by both said rheostat and said throttle so as to be responsive to the relative positions thereof as distinguished from their absolute positions for preventing said regulator from lowering the excitation of said generator below a value sufficient to maintain generator synchronism for any loading of said generator as determined by the accompanying throttle position and for raising the excitation to said value independently of the regulator if the excitation should be below said value.

8. In combination, a separately energized alternating current power circuit, a synchronous generator connected to supply electrical power to said circuit, a regulator responsive to the voltage of said generator for controlling the excitation thereof in such a manner as to help maintain constant generator voltage, said regulator having a relatively low speed lowering circuit for controlling the excitation lowering operation of a motor operated rheostat and a relatively high speed lowering circuit for controlling the operation of an excitation lowering contactor, said regulator also having a relatively low speed raising circuit for controlling the excitation raising operation of said rheostat, three pairs of co-operating limit contacts connected respectively to control said lowering and raising circuits of said regulator, means for moving a contact of each pair in accordance with the motion of said rheostat in such a way that whenever the rheostat is within a range of positions corresponding to values of excitation below a predetermined value said two excitation lowering circuits are rendered inoperative and said excitation raising circuit is rendered operative independently of the voltage of said generator, and means responsive to the load on said generator for moving the remaining contacts of each pair so as to raise said predetermined value when the load increases and lower said predetermined value when the load decreases, said predetermined value being sufficiently high to prevent loss of synchronism of said generator at a normal loading thereof.

9. In combination, a throttle valve for a prime mover, a rheostat for controlling the excitation of an electric generator driven by said prime mover, a movable element operated by motion of said throttle, a second movable element operated by motion of said rheostat, and means responsive to the predetermined relative position of said elements as distinguished from their absolute positions for preventing said rheostat from increasing its resistance.

LOUIS W. THOMPSON.
SELDEN B. CRARY.